Oct. 3, 1967    R. C. BOLESKY    3,344,504
METHOD OF FASTENING
Filed Oct. 15, 1964

INVENTOR.
RICHARD C. BOLESKY
BY James R. Hulen
ATTORNEY

United States Patent Office 3,344,504
Patented Oct. 3, 1967

3,344,504
METHOD OF FASTENING
Richard C. Bolesky, Warsaw, Ind., assignor to United States Rubber Company, New York, N.Y., a corporation of New Jersey
Filed Oct. 15, 1964, Ser. No. 404,106
7 Claims. (Cl. 29—432.2)

ABSTRACT OF THE DISCLOSURE

A method for attaching a cellular plastic sheet to a structural support member in such a manner as to avoid the use of fastening elements which penetrate both surfaces of the sheet. A securing element is embedded into an end of the sheet and the element is joined to a support member which is positioned adjacent one side of the sheet.

---

This invention relates to a method of fabricating plastic sheets and, more particularly, to a method of attaching cellular plastic sheets to structural support members.

In commercializing formed parts of expanded plastic sheets, considerable attention has been given to methods of attaching the formed parts to structural members (wood, plastic, metal, etc.) in a manner which will not cause damage to, or be visible on, the exposed surface of the part. While there are a number of commercial fasteners on the market, they are generally (1) of a type which requires that the fastening element be fitted entirely through the part, thereby being in plain view on the exposed part surface, or (2) a type adapted to be set into the surface of the part on the unexposed surface. This latter type, while successful in metal, wood and conventional non-cellular plastic, is not practical in, or adequate for use in cellular materials such as expanded plastic sheets.

Accordingly, an object of this invention is to provide a new and improved method for attaching cellular expanded plastic sheets to structural support members.

A further object of this invention is to provide a method for assembling expanded plastic sheets which enables the assembler to accurately position and locate the securing elements.

A still further object of this invention is to provide a method for attaching expanded plastic sheets wherein only one side of the sheet need be defaced, thus, causing no damage or visible markings to the exposed side of the sheet.

The above and further objects are accomplished in accordance with this invention which comprises the steps of embedding a securing element into an end of a cellular plastic sheet; positioning one side of the sheet adjacent a support member; and passing a securing means through a portion of the support member, through the one side of the sheet and through the securing element.

The invention will be described in detail with reference to the accompanying drawing wherein.

Figure 2:
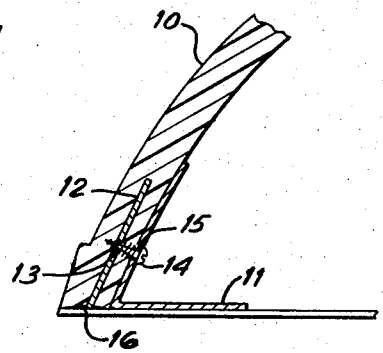
FIG. 2 is a fragmentary sectional view illustrating a structure assembled in accordance with the present invention.

Referring to the drawing, and more particularly to FIG. 2, an expanded plastic sheet is shown at 10. Sheet 10 may have an entirely cellular construction, such as, the type described in United States Patent No. 2,452,999 which issued on Nov. 2, 1948 to L. E. Daly or it may have a construction similar to the material described in United States Patent No. 3,041,220 which issued on June 26, 1962 to F. S. Martin et al. This latter type of sheeting has rather hard exterior surfaces but contains a cellular core section which provides very little holding power for conventional bolts or screws. Consequently, it has been found to be necessary to provide additional support means for the cellular sheets in order to effectively secure the sheets to structural support members such as bracket 11 in FIG. 2.

Figure 1:
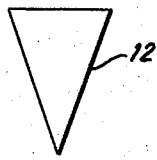
FIG. 1 is a plan view of a securing element used to accomplish the present invention.
Figures 3A, 3B:
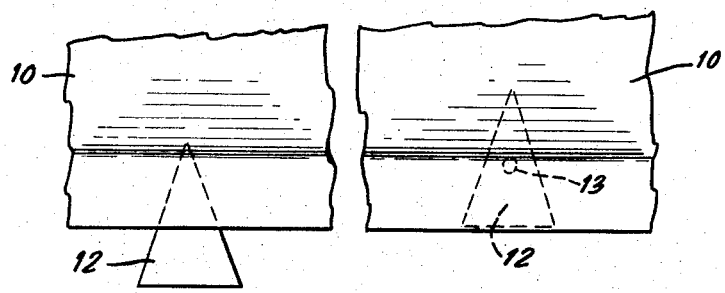
FIG. 3a is a side elevation view of FIG. 2 illustrating an intermediate step of the method.
FIG. 3b is a side elevation view of FIG. 2 illustrating the completed assembly.

In carrying out the process of the present invention, a small piece of sheet metal 12 (see FIG. 1), preferably in the general shape of a wedge, is driven (pointed end first) into an end of the cellular trimmed expanded plastic sheet 10. The shape of the small metal part or securing element 12 is not critical, although the wedge shape appears to be most beneficial in driving the securing element with more control into the cellular sheet. FIGS. 3a and 3b illustrate the general manner in which element 12 is driven into the end of sheet 10. The small wedge shaped plate is driven in to the extent that it is flush with the edge surface of sheet 10, or until it is slightly below the surface.

A small aperture 13 (see FIG. 3b) is then drilled (or punched) into the securing element 12 from that side of sheet 12 which will be adjacent to the structural member 11. Since element 12 is visible at the edge of sheet 10, the assembler will be able to accurately locate the position of element 12 and thereby accurately position aperture 13.

Thereafter, a sheet metal screw 14 is inserted through an aperture 15 in the structural member 11 and is screwed into sheet 10 and then into aperture 13 in element 12, thereby causing the expanded sheet 10 to be pulled up tightly to the structural support member 11.

The relatively large flat surface area of element 12 provides a high degree of holding power, and a strong anchor for the sheet metal screw 14. Therefore, a strong attachment is provided between sheet 10 and member 11 even though element 12 is embedded in the cellular end portion of the sheet.

Referring to FIG. 2, an epoxy coating 16 may be applied to the end portion of sheet 10, if desired, to provide protection against weathering for the end portion.

It will be apparent from the above that this same technique may be used for affixing either functional or decorative components to the surfaces of expanded plastic sheets along, or near, any exposed edge where the securing element can be driven into the cellular end portion of the sheet.

It will further be apparent from the foregoing description that the present invention provides a method for rapidly and accurately attaching a cellular plastic sheet or a plastic sheet having a cellular core section to a structural support member. The method enables the assembler to attach the sheet by slightly defacing only one side of the sheet and thereby renders the exposed surface of the sheet free of any visible marks.

While there has been described what is at present considered to be the preferred embodiment of this invention, it will be obvious to those skilled in the art that various changes and modifications may be made therein without departing from the invention, and it is therefore, aimed to cover all such changes and modifications as fall within the true spirit and scope of the invention.

Having thus described my invention, what I claim and desire to protect by Letters Patent is:

1. The method of attaching a cellular plastic sheet to a structural support member comprising the steps of: embedding a securing element into an end of said sheet; positioning one side of said sheet adjacent said support member; and joining said element and said support member through said one side.

2. The method of attaching a cellular plastic sheet to a structural support member comprising the steps of: embedding a securing element into an end of said sheet; forming an aperture through said securing element from one side of said sheet; positioning said one side adjacent said support member; and joining said element and said support member through said aperture.

3. The method of attaching a cellular plastic sheet to a structural support member comprising the steps of: driving a securing element into an end of said sheet; forming an aperture through said securing element from one side of said sheet; positioning said one side adjacent said support member; and passing a securing means through a portion of said support member and said aperture.

4. The method of attaching a cellular plastic sheet to a structural support member comprising the steps of: driving a securing element into an end of said sheet; drilling an aperture through said securing element from one side of said sheet; positioning said one side adjacent said support member; and passing a securing means through a portion of said support member and said aperture.

5. The method of attaching a cellular plastic sheet to a structural support member comprising the steps of: driving a securing element into an end of said sheet; forming an aperture through said securing element from one side of said sheet; positioning said one side adjacent said support member; and passing a screw through a portion of said support member and said aperture.

6. The method of attaching a cellular plastic sheet to a structural support member comprising the steps of: driving a thin wedge-shaped metal plate into an end of said sheet; drilling an aperture through said plate from one side of said sheet; positioning said one side adjacent said support member; and passing a screw through a portion of said support member and said aperture.

7. The method of attaching a plastic sheet having a cellular core section to a structural support member comprising the steps of: driving a thin wedge-shaped metal plate into said core section at an end of said sheets; drilling an aperture through said plate from one side of said sheet; positioning said one side adjacent said support member; and passing a screw through a portion of said support member and said aperture.

References Cited

UNITED STATES PATENTS

| | | | |
|---|---|---|---|
| 977,342 | 11/1910 | Stroh | 227—87 |
| 2,624,386 | 1/1953 | Russell. | |
| 2,955,291 | 10/1960 | Hansen | 29—432 |

CHARLIE T. MOON, *Primary Examiner.*

UNITED STATES PATENT OFFICE

CERTIFICATE OF CORRECTION

Patent No. 3,344,504                          October 3, 1967

Richard C. Bolesky

It is hereby certified that error appears in the above numbered patent requiring correction and that the said Letters Patent should read as corrected below.

In the heading to the printed specification, lines 3 to 5, for "assignor to United States Rubber Company, New York, N. Y., a corporation of New Jersey" read -- assignor to Uniroyal, Inc., a corporation of New Jersey --.

Signed and sealed this 3rd day of December 1968.

(SEAL)
Attest:

Edward M. Fletcher, Jr.

Attesting Officer

EDWARD J. BRENNER

Commissioner of Patents